United States Patent

[11] 3,538,941

[72] Inventor Marcus L. Bates
    6904 N. Russell Ave., Odessa, Texas 79760
[21] Appl. No. 729,074
[22] Filed May 14, 1968
    Continuation-in-part of Ser. No.
    698,186, Jan. 16, 1968, Pat. No.
    3,473,564
[45] Patented Nov. 10, 1970

[54] TRAVELING IRRIGATION APPARATUS
    10 Claims, 13 Drawing Figs.
[52] U.S. Cl. .................................................. 137/344,
    239/212, 239/191
[51] Int. Cl. ............................................... B05b 9/02,
    E01h 3/02
[50] Field of Search.......................................... 239/212,
    213, 177, 191; 137/344

[56] References Cited
    UNITED STATES PATENTS
    492,843   3/1893   Schweim ...................... 239/191
    1,085,609  2/1914   Heath .......................... 239/212X
    1,507,506  9/1924   Murphy ........................ 239/191X
    2,807,500  9/1957   Clayton ........................ 239/212X
    2,946,515  7/1960   Jensen .......................... 239/212
    3,179,340  4/1965   Walton et al. ................. 239/213X
    3,255,968  6/1966   Stafford ....................... 239/212
    3,349,794 10/1967   Behlen ......................... 137/344
    3,386,661  6/1968   Olson et al. ................... 239/212X FOREIGN PATENTS
215,616  11/1909  Germany .................. 239/191

Primary Examiner—Samuel Scott

ABSTRACT: A traveling irrigation apparatus having a water distribution means connected to a source of water. Spaced-apart wheels support the distribution means. One embodiment of the apparatus includes a motor and transmission means for propelling the wheels in a manner to cause the irrigation apparatus to travel along the surface of the ground. The motor includes buckets which are supported from the water distribution means by upwardly depending cantilever flow conduits. The buckets are spaced apart, fore and aft, from the distribution means with one bucket being emptied while the other is being filled, and vice versa. This action induces a rotational motion into the wheels due to the unbalanced weight of the buckets. The buckets reciprocatingly rotate in an arcuate manner about the distribution means whereupon the filled bucket is emptied while simultaneously the empty bucket is filled to thereby return the buckets in an opposite rotational direction. This arcuate reciprocatory motion of the motor is utilized to drive the wheels by means of a transmission comprised of a rack and pawl, with the rack being attached to the wheel and the pawl being attached to the bucket support means, or vice versa. Valve means associated with each bucket more efficiently promotes fluid flow thereto with each valve means being actuated by an over-the-center motion of a weight which is suitably suspended to part of the device, or alternatively, the valve means can be actuated by the action of the bucket striking the ground.

Patented Nov. 10, 1970
3,538,941
Sheet 1 of 2
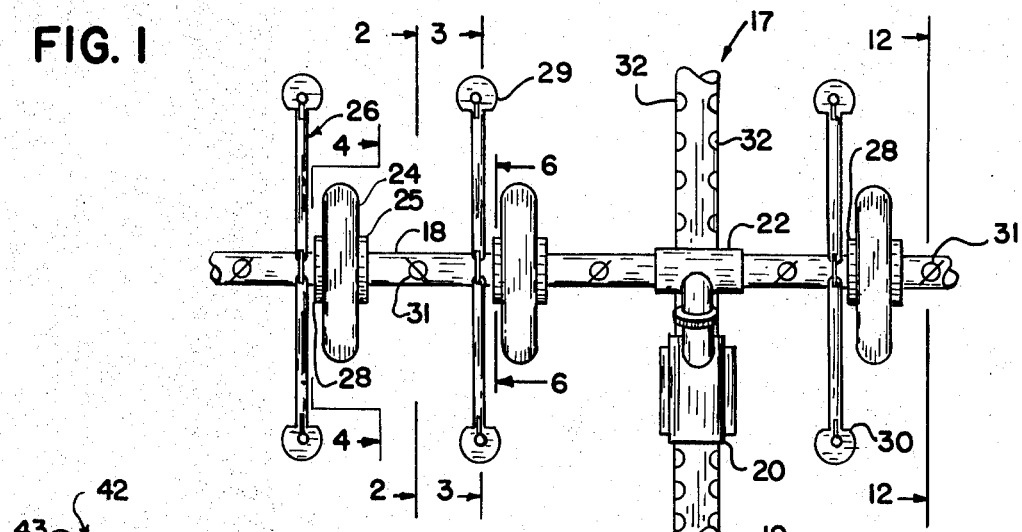
FIG. 1
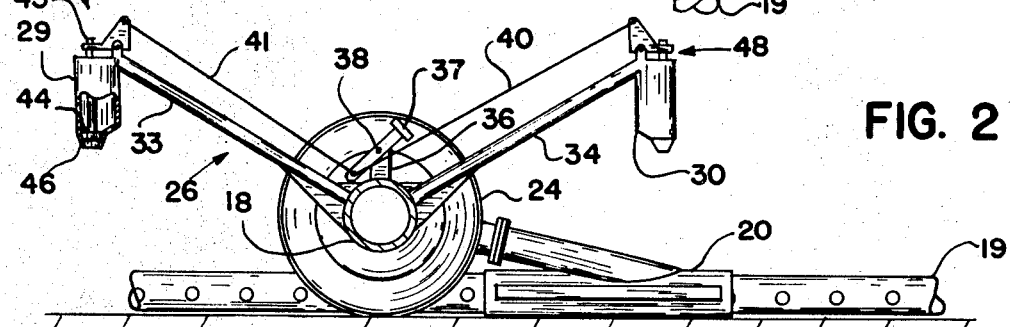
FIG. 2
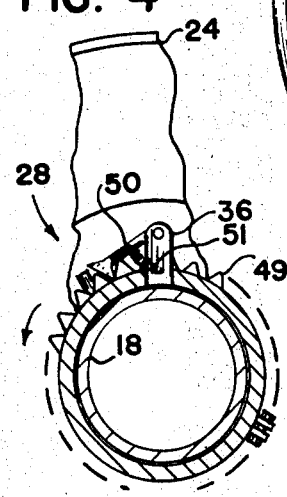
FIG. 4
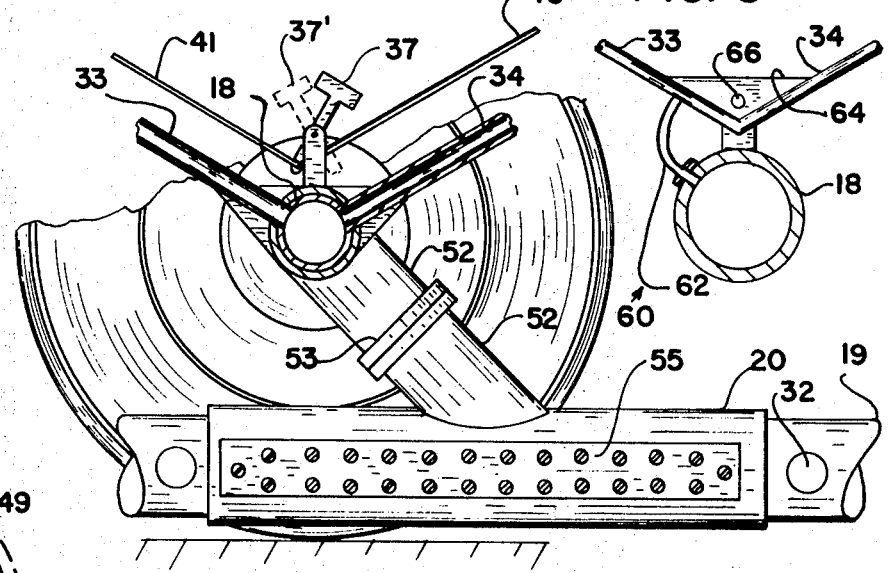
FIG. 3
FIG. 5
*INVENTOR.*
MARCUS L. BATES

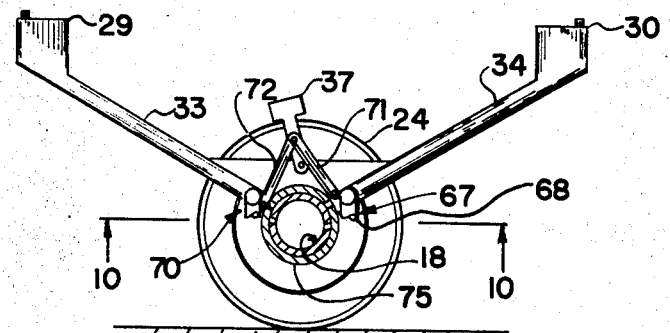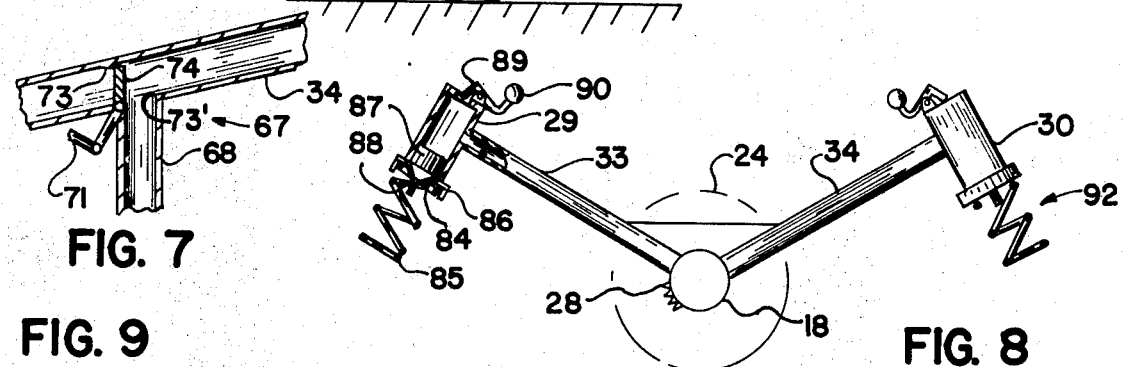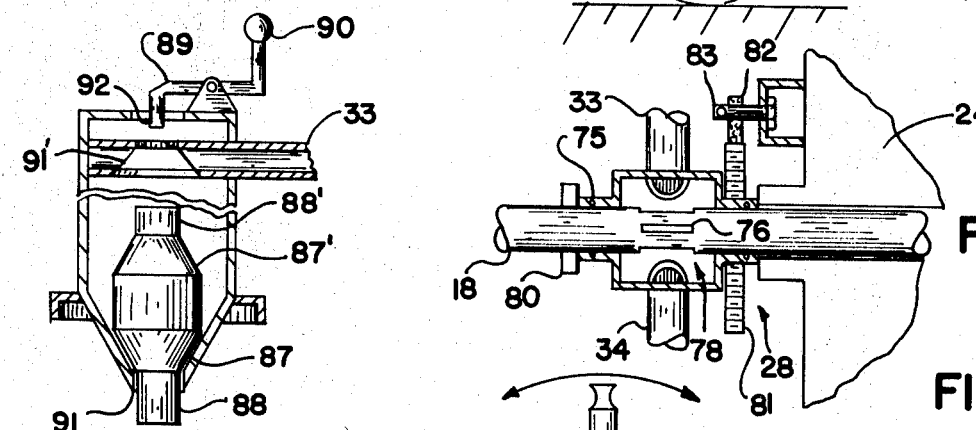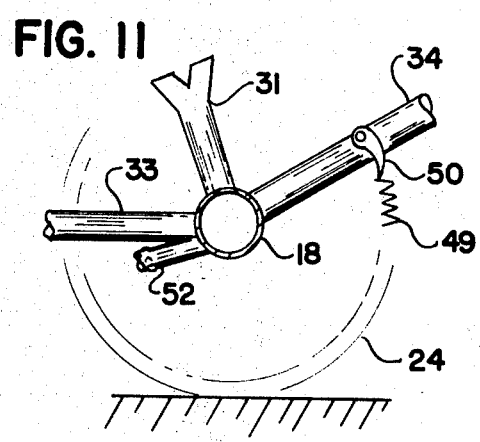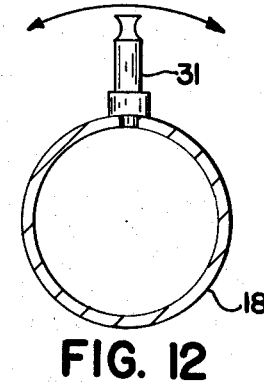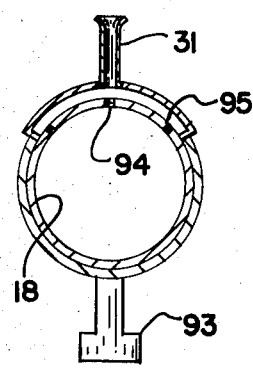

3,538,941

TRAVELING IRRIGATION APPARATUS

RELATED COPENDING PATENT APPLICATION

U.S. Pat. application Ser. No. 698,186; filed Jan. 16, 1968, now U.S. Pat. No. 3,473,564; entitled "MOVING FLUID COUPLING APPARATUS", of which this application is a continuation-in-part.

BACKGROUND OF THE INVENTION

There are many advantages to a traveling watering device for irrigating agriculture land, as evidenced by the multitude of devices of this nature represented by the prior art. Generally, these devices are comprised of complicated wheel-supported sprinkling systems which are propelled across the field by utilizing a power plant in the form of either a gasoline or water-driven motor. These motors generally are interconnected to a supporting drive wheel by a complicated drive line in order to maintain the various wheels which support the device centrally aligned with respect to each other and to the rows of the crop, thereby preventing damage to the growing foliage.

The gasoline motor, along with the drive lines and all of the other necessary gear reduction accessories, poses a continual maintenance problem. In addition to increasing the complexity of the device, all of the accompanying parts add to the overall weight which the soil must support. Because of the added weight of the indispensable parts of the prior art traveling irrigation systems, the soil is increasingly compacted with each use.

Upon reaching the end of the swath or area being watered, a traveling watering device must usually be moved to an adjacent swath. Since some traveling devices measure more than one thousand feet in length, lateral transportation thereof is a difficult and time-consuming endeavor.

SUMMARY OF THE INVENTION

This invention provides an improved traveling irrigation apparatus which uniformly distributes water upon the surface of the ground as it is propelled along by a series of wheels. The wheels also support the apparatus. A water-actuated motor provides power to a transmission with the transmission being interconnected between the wheels and the motor.

The motor is comprised of a first and second propelling bucket flow connected to a source of water and includes means for alternately filling one bucket while emptying the remaining bucket. This action imparts a reciprocating motion into the bucket arrangement which is utilized to actuate the transmission.

The transmission includes a rack and pawl, one being connected to a wheel, the other to the motor. The cyclic action of the motor enables the transmission to impart a unidirectional force to the wheels.

The motor may additionally be provided with valves which improve the efficiency of the operation of the device.

It is therefore a primary object of the present invention to provide a simplified traveling watering device which is greatly reduced in weight, cost, and complexity.

Another object of the present invention is to provide a motor and transmission for a traveling watering device which utilizes the weight of the irrigation water in order to actuate the device.

Another object of the present invention is the provision of a traveling irrigation system which utilizes the force of gravity acting upon water for propelling the device across a field, wherein the center of gravity of the system is caused to move fore and aft of the normal center of gravity.

Another object of the present invention is the provision of a traveling irrigation system having a water reservoir associated therewith which is alternately filled and emptied in order to impart rotational motion to the wheels which support the device.

A still further object of the present invention is the provision of a drive means for a traveling irrigation system wherein the drive means is comprised of a ratchet and pawl connected between the wheels which support the device and a reciprocating member wherein the reciprocating member is caused to move by the force of gravity acting upon the member.

A still further object of the present invention is the provision of a means for propelling a traveling irrigation system across a field by utilizing the potential energy of water which is allowed to flow into the propelling mechanism at one elevation and is allowed to flow from the mechanism at a lower elevation, thereby leaving the difference in potential energy as the available energy which is utilized to propel the vehicle along the ground.

The above objects are attained in accordance with the present invention by the provision of a traveling irrigation apparatus which is fabricated essentially as set forth in the above abstract. Other and further objects of the invention will become apparent to those skilled in the art as the description proceeds.

BRIEF DESCRIPTION OF THE DRAWINGS

FIG. 1 is a partial top plan view of the assembled apparatus made in accordance with the present invention. With the apparatus being illustrated in the configuration normally required as it travels across the ground which it is watering;

FIG. 2 is a cross-sectional view taken along line 2 of 1, with 1 with cut parts being cut away and shown in section and additional parts being shown in order to better illustrate the invention;

a cross-sectional view taken along line 3–3 of FIG. 1 with some parts being out away and other parts being shown in section in order to better illustrate the device;

FIG. 4 is a cross-sectional view taken along line 4–4 of FIG. 1;

FIG. 5 is a cross-sectional view of a modification of FIG. 3;

FIG. 6 is a cross-sectional view of a modification of FIG. 1;

FIG. 7 is an enlarged fragmentary cross-sectional view of FIG. 6;

FIG. 8 is a modification of part of the device seen in FIG. 4;

FIG. 9 is a modification of the device seen in the foregoing FIGS;

FIG. 10 is another modification of the device seen in the foregoing FIGS;

FIG. 11 is an enlarged fragmentary cross-sectional view of still another modification of the device seen in the foregoing FIGS; and FIGS. 12 and 13 are cross-sectional views illustrating a nozzle associated with the present device, which may be utilized in conjunction with any of the preceding embodiments.

DESCRIPTION OF THE PREFERRED EMBODIMENTS

Looking now to the details of the invention as illustrated in the various FIGS. of the drawings, there is seen in FIGS. 1 through 4 a traveling irrigation apparatus, generally illustrated by the arrow at numeral 17, and sometimes also referred to as a self-propelled watering device. A lateral tubing 18 is flow connected to a longitudinal supply tubing 19 by the illustrated moving coupling device 20, the details of which are more particularly pointed out in my copending U.S. Pat. application Ser. No. 698,186. A swivel joint 22 permits the lateral tubing to move in a limited rotational manner with respect thereto. Wheels 24 are suitably journaled at spaced-apart intervals along the lateral tubing and are rotatably maintained in aligned position by means of journal 25. A number of spaced-apart motors, one of which is generally indicated by the arrow at numeral 26, are connected to a transmission, one of which is generally indicated by the arrow at numeral 28. Each motor includes a propelling bucket 29 and a return bucket 30, the former preferably being larger than the latter. A multiplicity of sprinklers 31 are provided at spaced-apart intervals along the lateral tubing, although other water distribution means could be used in place of the sprinklers.

The longitudinal supply tubing is seen to include a multiplicity of spaced-apart valves 32 which are depressed when received within the moving coupling device as is explained in greater detail in the before-mentioned other patent application.

First and second cantilever arms, 33 and 34 respectively, are attached to the lateral tubing and reinforced by the illustrated webbing. An upstanding bracket 36 pivotally supports a weighted over-the-center valve actuator 37 by means of the illustrated journal 38. Control rods 40 and 41 have the rod end portions thereof attached to the valve actuator and to a valve tappet which forms part of the valve assembly 42.

The upper depending end of a valve stem 43 is received by the valve tappet. The lower end portion of the valve stem terminates in the form of a valve element 44 which sealingly cooperates with a valve seat 46, with the valve seat also forming the outlet for the lower extremity of bucket 29. The return bucket 30 has a similar valve arrangement as generally indicated by the arrow at numeral 48.

As best seen in FIG. 4, a rack and pawl (sometime called a ratchet) forms the before-mentioned transmission. The rack is illustrated as a toothed gear 49 which is rigidly affixed to the hub of wheel 24. The pawl 50 is biased into releasable engagement with the rack by means of an over the center spring 51. The pawl is journaled to the lateral tubing by means of the illustrated before-mentioned upstanding member 36. A downcomer 52 is rigidly affixed to the before-mentioned swivel joint and includes a flexible coupling 53. The flexible coupling includes a moving valve actuator housing 55.

As seen in the modification of FIGS. 6 and 7, the propelling and return buckets communicate with the lateral tubing by the upwardly depending cantilever arms 33 and 34. The lower extremity of the cantilever arms are provided with a three-way valve assembly, generally indicated by the arrow at 67, and a downspout 68. The arrow at numeral 70 indicates a similar valve and downspout arrangement. Control arms 71 and 72, respectively, actuate the three-way valves of the respective buckets from the opened to the closed position, and vice versa, with the valve arrangement 67 being oppositely positioned with respect to the valve arrangement 70. That is, when valve 67 is open, valve 70 is closed, and vice versa. The control arms are manipulated by the action of the over-the-center weight 37. The term "three-way valve" is intended to include a valve such as illustrated in FIG. 7, that is, a valve having three passageways wherein a single valve actuator controls the flow of fluid along two different flow paths. Such a valve is sometime erroneously referred to as a "two-way valve". As seen in the simplified valve arrangement of FIG. 7, the three-way valve includes a seat 73, 73' and a journaled valve element 74. With the valve element in its present-illustrated position, flow occurs from the bucket 30, through conduit 34, to where the fluid then flows through the downcomer 68 and onto the ground. When the valve assembly is moved to its opposite position, flow can occur only from the lateral pipe, through conduit 34, and into the bucket, thereby filling the bucket with fluid from lateral pipe 18.

Looking now to the modification of FIGS. 8 and 9, wherein the propelling and return buckets are each provided with a heavy coil spring as seen at 85 on the propelling bucket. The spring is suitably attached to a spring retainer 86, with the bucket including a valve float member 87 located therein. The valve float member includes a downwardly depending portion 88 which is adapted to strike the ground when the spring is sufficiently compressed. A valve seat 84 sealingly cooperates with the illustrated lower conical portion of the valve float to preclude fluid flow therethrough when the float is properly seated. The chamber is vented as seen at 91. As best seen in the illustration of FIG. 9, the valve cooperates with the vent at 91 immediately after it has been unseated from its lower seat, with the valve floating to the surface of the water contained in the bucket. The arrow at numeral 92 of FIG. 8 generally illustrates a valve assembly similar to the one associated with bucket 29.

Looking now to the details of FIG. 10, the before-mentioned cantilever arms 33 and 34 are each rigidly attached to a swivel 75. The lateral tubing is provided with a series of slots 76 which are each maintained in alignment with an annular chamber 78 by means of the abutment or retainer 80. A rack 81 is rigidly attached to the swivel. A pawl 82 is journaled to the wheel by means of a bracket and pin 83, with the pawl being disposed in operative relationship with respect to the rack. This action enables engagement of the pawl and rack when the rack is moved in one direction, and disengagement therebetween when the rack is moved in the opposite direction.

In the simplified embodiment of FIG. 11, the cantilever conduits 33 and 34 are seen to be directly attached to the lateral tubing and reinforced as deemed desirable by gussets, such as illustrated in FIGS. 2 and 3. Downcomer 52 is preferably directly coupled to a supply hose. The outer periphery of the wheel 24 is serrated to form the illustrated rack 49. The pawl 50 is directly affixed in a pivotal manner to one of the cantilever flow conduits. Nozzle 31 can be of any design, although a low-pressure nonrotating nozzle such as illustrated in FIGS. 12 or 13 is preferred. The apparatus of FIG. 11 drags the supply conduit along with it as the lateral tubing 18 is reciprocated with a limited circular motion by the action of the gravity acting upon the alternately filled buckets (not shown). The buckets may be fabricated in a manner as taught in FIGS. 2, 6, or 8.

Where it is deemed desirable, the nozzle may be maintained in a vertical direction in accordance with the illustration of FIG. 13 by the provision of a swivel having a weight 93 which maintains nozzle 31 vertically disposed with respect to conduit 18. Slots 94 communicate with annulus 95 to thereby provide a fluid flow path from the inside of lateral tubing 18, through slots 94, into annulus 95, whereupon water is sprayed from the nozzle 31.

OPERATION

In operation the device is assembled in the manner of FIG. 1 and is provided with any suitable longitudinally extending supply conduit, such as seen at 19, for example only. The supply tubing is connected to a suitable source of water whereupon the device will commence to travel in either direction along the field longitudinally with respect to the supply conduit. The motor 26 actuates the transmission 28 to thereby drive the wheels a limited amount each time the motor reciprocates in an arcuate manner.

As seen in the embodiment of FIGS. 1 and 2, the device is suitably supported by rotatable wheels 24, with the wheels being rotatably secured to the lateral tubing 18. Water flows from a suitable source (not shown), through longitudinal supply tubing 19, through the moving coupling device 20, through the swivel joint 22, along the lateral tubing 18, and into each of the cantilever arms 33 and 34. At the same time each of the sprinklers are provided with a source of fluid. Buckets 29 and 30 downwardly depend from the upper terminal ends of the cantilever tubing, and each receives a continual supply of water at a rate which is less than the outflow rate when the valve 44, for instance, is open. In other words, when either of the valve assemblies, 42 or 48, is in the open position, the buckets, 29 or 30, will contain a negligible residual amount of water therein due to the relative cross-sectional areas of valve seat 46 and arm 33. Accordingly, with the device in the configuration of FIG. 2, bucket 29 will be filling since the valve associated therewith is closed, while the valve associated with bucket 30 will be open, and accordingly no appreciable amount of water will be contained therein. When bucket 29 accumulates sufficient water the force of gravity will pull the moment arm or cantilever arm in a downward direction, towards the ground, whereupon lateral tubing 18 will rotate with the cantilever arm and at the same time pawl 50 will engage a tooth of rack 49 of an adjacent wheel 24, to thereby propel the device in a forward direction. As conduit 18 rotates in a counterclockwise direction, the center of mass of the weighted over-the-center valve actuator will pivot or fall in a counterclockwise direction, thereby causing valve assembly 42 to open and valve assembly 48 to close. Bucket 29 will now begin to drain, while bucket 30 begins to fill due to the operative position of their respective valves.

As bucket 30 is filled with water, the center of mass of the lateral tubing 18 and the associated buckets will shift to the right as viewed in FIG. 2. When the center of mass has moved a sufficient distance to the right, lateral tubing 18 will rotate in a clockwise direction, whereupon pawl 50 will ratchet against the rack 49 (that is, pawl 50 will merely ride across the various teeth of rack 49 without driving wheel 24). As the center of gravity of the weighted over-the-center valve actuator passes through a vertical line at journal 38, the actuator will pivot or fall to the right, thereby opening valve assembly 48 and closing valve assembly 42, whereupon bucket 30 will begin to drain and bucket 29 will begin to fill, thereby again shifting the center of gravity of the entire device from the right back to the left whereupon lateral tubing 18 will again rotate about its central axis in a counterclockwise direction, causing the pawl 50 to again engage the rack 49 to thereby drive the apparatus in a direction towards the left as viewed in FIG. 2. The reciprocating action of the buckets, cantilever arms, and conduit 18 therefore drive the self-propelled watering device across the field as the center of gravity is shifted forward and aft of the lateral tubing, and with this action being taken advantage of by the simplified transmission which is comprised of the pawl and rack. It should be understood that the apparatus of FIGS. 1, 2, 3, 6, and 8 are shown in the intermediate pivotal position.

When it is desired to relocate the self-propelled watering device in order to enable it to traverse the next adjacent swath, the spring loaded pawl 50 is rotated about its journaled pivot point in a clockwise direction (as viewed in FIG. 4) whereupon the pawl 50 will now drive the wheel in an opposite direction with respect to the illustration of FIG. 4. By reversing all of the pawls located to the right of the longitudinal supply tubing, the wheels on one side of the watering device will be driving the apparatus in a reverse direction with respect to the wheels located to the left of the apparatus. This action causes the entire watering device to pivot at its midpoint, thereby changing its direction of travel towards any predetermined location desired. When reversing the device in this manner, the longitudinal supply tubing must obviously be a flexible conduit which is directly connected to the swivel joint 22.

In the embodiment of FIGS. 6 and 7, the buckets 29 and 30 upwardly depend from conduits 33 and 34, and accordingly it is possible to completely drain each of the buckets and the conduits by means of downcomers such as indicated by numerals 58 and 70. By providing each of the cantilever arms with a downcomer and a three-way valve in the illustrated manner of FIGS. 6 and 7, the weighted over-the-center valve actuator controls the action of the valves to permit flow to occur along the following path: from lateral tubing 18 through valve seat 73, through cantilever conduit 34 into bucket 30. Since downcomer 68 is closed, no flow of water occurs therethrough. While bucket 30 is filling with fluid, valve assembly 70 is in the opposite configuration and accordingly water is prevented from flowing from lateral tubing and into the bucket 29. During this time the downcomer of valve assembly 70 is in communication with bucket 29, and accordingly the fluid contents of bucket 29, including cantilever conduit 33 is drained. This action fills bucket 30 and its conduit while simultaneously emptying bucket 29 and its conduit to thereby shift the center of gravity of the entire device to the right (rearward of the apparatus) whereupon the device rotates in a clockwise direction. As the center of mass of the weighted over-the-center valve actuator 37 travels through a vertical plane defined by its pivoted connection, the relative position of the valves will be reversed, whereupon valve 67 will prevent flow to occur from tubing 18 and at the same time drain conduit 34 and bucket 30 through downcomer 68. As this occurs, the downcomer associated with valve assembly 70 is cut off while the conduit 33 is connected to the tubing 18 thereby permitting the bucket 29 to fill with water. This action of filling bucket 29 and draining bucket 30 soon shifts the center of gravity from a rearward position back to a forward position a sufficient amount to cause counterclockwise rotation of the buckets and cantilever arm or motor.

The action of the valves continues in this manner to thereby cause the motor to reciprocate back and forth in a limited arc. This action permits the transmission to harness the work represented by the loss in potential energy from the position where the buckets are filling to the position where the buckets are emptied. The transmission may be in the form of a pawl and rack as illustrated in FIGS. 4 or 11. The over-the-center actuator 37 should cause each bucket to completely drain prior to the cantilever arm assuming the horizontal, otherwise residual water will remain in the bucket, causing an inefficient operation.

In the illustrated embodiments of either FIGS. 8 or 9, a floating valve together with a gravity-actuated over-the-center magnetic valve actuator is utilized to control the action of the motor. The floating valve includes portions 87, 87' having depending ends 88, 88'. As the cantilever arms rotate in a counterclockwise direction, the heavy coil spring strikes the ground where it is compressed sufficiently for the depending end 88 of the valve to be forcibly moved in an upward direction with respect to the bucket, whereupon the valve floats to the surface of the liquid contained within the bucket. Upon upper end 88 of the valve element contacting magnet 92, valve portion 87' becomes seated within the complimentary seat 91' to thereby effectively prevent fluid flow through conduit 33. This action enables the contents of the bucket 29 to be drained through the valve seat 91. As the elevated bucket 30 is filled, the center of gravity of the motor shifts or moves rearwardly until an unbalanced condition is reached which causes the clockwise rotation of the motor. Clockwise rotation of the motor causes valve actuator 89 to rotate clockwise about the illustrated pivot pin. This action releases magnet 92 from the valve portion 88' whereupon valve 87 is seated within complimentary seat 91 while valve assembly 92 is upset as it strikes the ground, thereby releasing the float valve at 92 and allowing the fluid to drain from the bucket 30 in the same manner as previously described in conjunction with bucket 29. This action of alternately filling and emptying the buckets continues, causing the motor to cycle or rotate back and forth in a limited arc, with each valve actuator portion of each bucket alternately enabling one bucket to fill while the other bucket empties.

In the embodiment of FIG. 10 the motor is seen to be journaled to the tubing 18 by means of a sealed swivel 75. Flow occurs from the interior of the tubing and into the bucket by means of the multiplicity of radially disposed slots 76 which communicate with the annular chamber 78 which in turn communicates with each open terminal end of the cantilever arms. Seals are provided at each longitudinal extremity of the swivel to preclude leakage of water therefrom. Accordingly, the buckets, arm, and swivel are all rigidly connected together and are free to rotate in a limited arc about the tubing 18. The annular chamber 78 is maintained in alignment with slots 76 by means of a suitable stop member 80 located on one side and the hub of wheel 24 which is located on the opposite side of the swivel. The rack 81 is rigidly secured in any suitable manner to the swivel, although the rack could be located on the wheel 24 with the pawl being journaled to the swivel or to one of the cantilever conduits, if desired.

In the embodiment of FIG. 12, the tubing 18 does not rotate along with the cantilever arm and buckets. Where it is desired to directly connect wheel 24 to the tubing 18, the relative position of the rack and pawl must be reversed unless the pawl is spring loaded into engagement with the rack, otherwise the pawl will fall away from the rack as the pivot 83 reaches its lowermost position.

As will now be apparent to those skilled in the art, the motor of either FIGS. 2, 6, or 8 can be used in conjunction with the transmission of FIGS. 4, 10, or 11 to propel an irrigation apparatus across a field of plowed or unplowed ground, while utilizing water as the source of energy for the motor. Where deemed desirable, sprinklers, such as seen at 31 (FIGS. 1, 11, 12, or 13) can be used to distribute water from the lateral conduit. In many instances, however, the water which is emptied from each bucket will supply sufficient water for irrigation purposes. In the last instance, the individual sprinklers 18 may be either plugged off or omitted from the lateral conduit.

The means by which the lateral conduit is provided a source of fluid may include any known prior art expedient. The particular supply means illustrated herein is by way of example only.

While I have illustrated and described certain preferred embodiments of my invention, it will be understood that these are illustrative only and that the salient features of the invention may be carried out in other manner and with other apparatus than those specifically described.

I claim:

1. In a traveling watering apparatus having spaced-apart wheels attached thereto for propelling the apparatus along the surface of the ground while the apparatus distributes water, a source of water connected to the apparatus, the improvement comprising:

means forming a motor and transmission with said transmission connecting said motor to one of said wheels to thereby cause the wheel to rotate and move the apparatus along the surface of the ground;

said motor including a first bucket, means mounting said bucket to the apparatus for enabling the bucket to be moved between a first position of elevation and a second position of elevation wherein said first position is vertically higher in elevation with respect to the second position;

flow control means flow connecting said bucket to the source of water for causing the bucket to fill with water when the bucket is in said first position whereupon the weight of the water forces the bucket to move to said second position, said flow control means further including means for causing water to flow out of the bucket when the bucket is in said second position;

said motor further including return means by which said bucket is forced to move from said second position to said first position after said flow control means has emptied the bucket; and said return means includes a second bucket which is adapted to be moved between a first and a second position of elevation; means for conducting the flow of water from the source to said second bucket to fill said second bucket with water as said second bucket assumes an elevated position and for emptying water from said second bucket as said second bucket assumes a lower position of elevation to thereby enable the oscillating motion of the motor to drive the transmission which in turn propels the apparatus along the ground.

2. The combination of claim 1 wherein said bucket radially depends from the central axis of the wheel to thereby provide a moment arm which travels in a limited arc, said moment arm having means associated therewith which causes said transmission to engage the wheel when said bucket travels in a downward direction, to thereby rotatably propel the wheel; and, the last said means disengages said transmission from said wheel when said return means raises said bucket.

3. The combination of claim 1 wherein said transmission includes:

a rack and pawl;
said rack being attached to the wheel;
said pawl being attached for reciprocating arcuate movement to the motor, whereby;
upward movement of said bucket allows said pawl to ratchet along said rack and downward movement of said bucket causes said pawl to engage said rack to thereby propel the wheel in a rotational manner.

4. The combination of claim 1 wherein said wheels are journaled to a lateral tubing; said propelling bucket being supported from and flow-connected to the lateral tubing by a first cantilever arm, said return bucket being supported from and connected to said lateral tubing by a second cantilever arm.

5. In a traveling watering apparatus having spaced-apart wheels attached thereto for enabling the apparatus to move along the surface of the ground while distributing water, a source of water flow connected to the apparatus, the improvement comprising:

means forming a motor and transmission with said transmission connecting said motor to one of said wheels to thereby cause the wheel to rotate and move the apparatus along the surface of the ground;

said motor including a first bucket, means mounting said bucket to the apparatus to enable the bucket to be moved between a first position of elevation and a second position of elevation wherein said first position is vertically higher in elevation with respect to the second position;

flow control means including valve means for flow-connecting said bucket to the source of water to cause the bucket to fill with water when the bucket is in the first position whereupon the weight of the water forces the bucket to move to the second position, said flow control means further including means for causing water to flow out of the bucket when the bucket is in the second position;

said motor further including return means by which the bucket is forced to move from the second position to the first position;

said return means includes a second bucket spaced apart from said wheels and mounted for movement between two different positions of elevation; means including valve means forming a flow path for water to be conducted from the source to the said second bucket;

means for causing said valve means to fill said second bucket with water as said second bucket assumes an elevated position with respect to said first bucket; and means for emptying water from said second bucket as said second bucket assumes a lower position of elevation with respect to said first bucket.

6. The combination of claim 5 wherein said valve means includes an over-the-center valve actuator which is actuated by gravity to move said valve means to the open position upon the first said bucket reaching the lower position and moves said valve to the closed position upon the last recited said bucket reaching the upper position of elevation.

7. The improvement of claim 5 wherein said valve means includes:

a valve located near the lower extremity of said bucket for emptying water therefrom;

said valve having a valve element and a valve seat with said valve element adapted to cooperate with said valve seat to prevent flow of water from said bucket;

said valve seat forming an outlet flow passageway from said bucket;

said valve element being in the form of a float and having a depending lower end portion which extends away from and through said seat whereby the lower end portion is adapted to strike the ground when said bucket reaches the lowermost position of elevation; whereby:

when said bucket approaches the ground, said valve is upset to the open position to thereby cause said valve element to move toward the surface of the water in the bucket to thereby allow the contents of the bucket to be emptied, whereupon the bucket may then be elevated and filled with water.

8. The combination of claim 5 wherein said means mounting said first bucket to the apparatus includes a conduit which radially depends from the central axis of a wheel to thereby provide a moment arm which travels with an oscillatory motion in a limited arc, said moment arm having means associated therewith which causes said transmission to engage the wheel when said propelling bucket travels in a downward direction, to thereby rotatably propel the wheel; and, the last said means disengages said transmission from the recited wheel when said return means elevates said bucket.

9. In a traveling watering apparatus having spaced-apart wheels attached thereto for enabling the apparatus to move along the surface of the ground while distributing water, a source of water flow connected to the apparatus, the improvement comprising:

means forming a motor and transmission with said transmission connecting said motor to one of the wheels to thereby cause the wheel to rotate and move the apparatus along the surface of the ground;

said motor including a bucket, means mounting said bucket to the apparatus to enable the bucket to be moved between a first position of elevation and a second position of elevation wherein said first position is vertically higher in elevation with respect to the second position;

flow control means including valve means having an over-the-center actuator means connected thereto including a weighted over-the-center actuator which is actuated by gravity in response to said bucket moving between the recited first and second position to thereby flow connect said bucket to the source of water to cause said bucket to fill with water when the bucket is in the recited first position whereupon the weight of the water in the bucket forces the bucket to move to the recited second position, said actuator means moving said valve means of said flow control means to cause water to flow out of said bucket when the bucket is in the recited second position;

said motor further including return means by which said bucket is forced to move from the recited second position to the recited first position when the bucket is empty; whereby:

the flow control means and return means causes the bucket to oscillate between the recited first and second position to thereby provide the energy by which the motor drives the transmission which in turn rotatably forces the wheel to propel the apparatus along the ground.

10. The improvement of claim 9 wherein said valve means includes:

a valve located near the lower extremity of said bucket for emptying water therefrom;

said valve having a valve element and a valve seat with said valve element adapted to cooperate with said valve seat to prevent flow of water from said bucket;

said valve seat forming an outlet flow passageway from said bucket;

said valve element being in the form of a float and having a depending lower end portion which extends away from and through said seat whereby the lower end portion is adapted to strike the ground when said bucket reaches the lowermost position of elevation; whereby:

when said bucket approaches the ground, said valve is upset to the open position to thereby cause said valve element to move toward the surface of the water in the bucket to thereby allow the contents of the bucket to be emptied, whereupon the bucket may then be elevated and filled with water.